Patented June 19, 1951

2,557,904

UNITED STATES PATENT OFFICE 2,557,904

5-(2-TETRAHYDROFURYL) HYDANTOIN AND PRODUCTION THEREFROM OF 5-(4-HYDROXYBUTYL) HYDANTOIN

Edgar C. Britton, Yancey J. Dickert, and Halbert C. White, Midland, Mich., assignors to The Dow Chemical Company, Midland, Mich., a corporation of Delaware No Drawing. Application April 21, 1949, Serial No. 88,896

4 Claims. (Cl. 260—309.5)

This invention concerns a new compound, 5-(2-tetrahydrofuryl) hydantoin and a method of making 5-(4-hydroxybutyl) hydantoin therefrom.

The 5-(4-hydroxybutyl) hydantoin is a known compound, heretofore prepared from other starting materials and in other ways. Both it and the new compound, 5-(2-tetrahydrofuryl) hydantoin, provided by the invention are useful as intermediates in the manufacture of an essential amino acid, lysine.

We have found that 5-(2-tetrahydrofuryl) hydantoin may be prepared in good yield by reacting tetrahydrofurfuraldehyde with an aqueous solution of an alkali metal cyanide and ammonium carbonate or ammonium bicarbonate. We have further found that the 5-(2-tetrahydrofuryl) hydantoin may readily be reduced in the presence of an active hydrogenation catalyst to obtain a good yield of 5-(4-hydroxybutyl) hydantoin in the form which is free, or nearly free, of isomers.

It may be mentioned that other furane and tetrahydrofurane derivatives such as furfuryl alcohol, tetrahydrofurfuryl alcohol, ethylfurfurylcarbinol, and butylfurfurylcarbinol, etc,. have heretofore been hydrogenated in the presence of catalysts such as platinum oxide, a copper-chromium oxide mixture, or a mixture of copper, chromium oxide and barium oxide, etc., but that the results have not been similar to those obtained in the present reduction of 5-(2-tetrahydrofuryl) hydantoin. In general, the art indicates that the hydroxyalkylfuranes react to form a mixture of a number of products including isomeric dihydric alcohols, and that the tetrahydrofurane ring is very resistant to reduction and requires vigorous hydrogenation conditions to obtain even an incomplete fission of the ring. For instance, Conner and Adkins, J. A. C. S. 54 4678 (1932) show that furfuryl alcohol undergoes reduction to form a complex mixture of products including approximately equal amounts of 1,2-pentanediol and 1,5-pentanediol, and that tetrahydrofurfuryl alcohol is only about 23 per cent consumed, i. e. reduced, after eleven hours of heating at 250° C. together with a hydrogenation catalyst under a hydrogen pressure of between 140 and 210 atmospheres. In contrast, the 5-(2-tetrahydrofuryl) hydantoin of the invention may catalytically be reduced very readily to obtain a good yield of 5-(4-hydroxybutyl) hydantoin.

The compound, 5-(2-tetrahydrofuryl) hydantoin is prepared by reacting tetrahydrofurfuraldehyde, $C_4H_7OCHO$, with an aqueous solution of an alkali metal cyanide, e. g. NaCN or KCN, and ammonium carbonate or ammonium bicarbonate at temperatures of from 40° to 120° C., preferably from 60° to 90° C. Approximately one molecular equivalent of the alkali metal cyanide and about 1.5 molecular equivalents of ammonium carbonate or bicarbonate are usually employed per mole of the tetrahydrofurfuraldehyde, but either the alkali metal cyanide or the ammonium carbonate or bicarbonate may be used in smaller amount or in as large a proportion as desired. At reaction temperatures of from 60° to 90° C., the reaction is usually complete in from 1 to 3 hours. The 5-(2-tetrahydrofuryl) hydantoin product may be separated by precipitation with a mineral acid, or in other ways usual for the recovery of hydantoins from the mixtures in which they are formed. When necessary, the product may be purified by recrystallization from water. It is a white crystalline compound, melting at approximately 186° C. Its structural formula is:

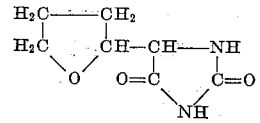

The 5-(2-tetrahydrofuryl) hydantoin may be reduced by reaction with hydrogen in the presence of catalysts effective in the hydrogenation of other derivatives of furane or tetrahydrofurane. However, the catalysts vary considerably in effectiveness and in some instances are of low activity, due presumably to catalyst poisoning. We have found that palladium is exceptionally effective in the reaction and is resistant, or less susceptible, to poisoning. Accordingly, although other hydrogenation catalysts can be used, provided sufficiently high reaction temperatures and hydrogen pressures are employed, finely divided palladium permits the reaction to be carried out rapidly at moderate temperatures and pressures and is preferred.

The hydrogenation is usually accomplished by dissolving the 5-(2-tetrahydrofuryl) hydantoin in an aqueous solution of an alkali, e. g. sodium hydroxide, potassium hydroxide, or ammonium hydroxide, adding a minor amount of the palladium catalyst and contacting the mixture with hydrogen. The finely divided palladium is usually employed in amount corresponding to from 0.05 to 0.5 per cent of the weight of the 5-(2-tetrahydrofuryl) hydantoin, but it may be used in smaller amount or in as great a proportion as desired. It is preferably in the form of finely divided palladium supported on a porous carrier, e. g. charcoal. The hydrogenation may be accomplished at 0° C. or above and at hydrogen pressures of one atmosphere or higher. It is usually carried out at temperatures of from 0° to 100° C., preferably from room temperature to 50° C., and at hydrogen pressures of from 0 to 100, preferably from 20 to 100, pounds per square inch gauge, but reaction temperatures and pressures far higher than just stated can be used. Under the preferred reaction conditions just given, the hydrogenation may be carried out in from ½ to 2 hours.

After completing the hydrogenation, the catalyst is removed, e. g. by filtration, and the mixture is neutralized and cooled to precipitate the 5-(4-hydroxybutyl) hydantoin product.

The following examples describe certain ways in which the invention has been practiced, but are not to be construed as limiting its scope.

Example 1

A solution of 53 grams (0.99 mol) of ammonium chloride, 113 grams (0.98 mol) of ammonium carbonate monohydrate, 49 grams (0.99 mol) of sodium cyanide and 600 cc. of water was warmed to 30° C. and 300 cc. of methyl alcohol was added. Ninety grams (0.90 mol) of tetrahydrofurfuraldehyde was then added gradually over a period of 30 minutes. Thereafter, the mixture was heated at 70° C. for 2.5 hours. The mixture was then neutralized with hydrochloric acid and cooled to about room temperature, whereby the product was precipitated. It was separated by filtration, washed with water and dried. There was obtained 92 grams, or approximately 60.2 per cent of the theoretical yield, of 5-(2-tetrahydrofuryl) hydantoin. The product was of good quality, but somewhat low melting, i. e. in a melting point determination it softened perceptibly at 150° C. and was molten at 180° C. The compound has been purified by recrystallization from water and obtained as white crystals melting at 186° C.

Example 2

Eleven cubic centimeters of an aqueous sodium hydroxide solution of 30 per cent concentration was diluted with 125 cc. of water and 17 grams of 5-(2-tetrahydrofuryl) hydantoin was dissolved in the solution. Approximately one gram of a palladium-containing catalyst, consisting of 5 per cent by weight of finely divided palladium on charcoal, was added. The mixture was agitated and contacted at room temperature with gaseous hydrogen at a pressure of from 30 to 40 pounds per square inch, gauge, for 30 minutes. The excess hydrogen was then vented, and the mixture was filtered to remove the catalyst. The mixture was then neutralized with acetic acid to precipitate the product which was separated by filtration, washed with water and dried. There was obtained 15.7 grams, or 91.2 per cent of the theoretical yield, of 5-(4-hydroxybutyl) hydantoin of good quality.

Other modes of applying the principle of the invention may be employed instead of those explained, change being made as regards the method or product herein disclosed, provided the steps or compounds stated by any of the following claims or the equivalent of such stated steps or compounds be employed.

We therefore particularly point out and distinctly claim as our invention:

1. A method which comprises reacting tetrahydrofurfuraldehyde with an aqueous solution of an alkali metal cyanide and an ammonium carbonate at temperatures between 40° and 120° C. to form 5-(2-tetrahydrofuryl) hydantoin, and hydrogenating the latter in the presence of a catalyst to form 5-(4-hydroxybutyl) hydantoin.

2. A method which comprises dissolving 5-(2-tetrahydrofuryl) hydantoin in an aqueous alkaline medium, adding a palladium-containing catalyst, and hydrogenating the dissolved 5-(2-tetrahydrofuryl) hydantoin by contacting the mixture with hydrogen at a pressure at least as great as atmospheric pressure and at a temperature between 0° and 100° C. to form 5-(4-hydroxybutyl) hydantoin.

3. A method, as described in claim 2, wherein the hydrogenation is carried out at temperatures between room temperature and 50° C. under a hydrogen pressure of from 20 to 100 pounds per square inch, gauge.

4. 5-(2-tetrahydrofuryl) hydantoin.

EDGAR C. BRITTON.
YANCEY J. DICKERT.
HALBERT C. WHITE.

REFERENCES CITED

The following references are of record in the file of this patent:

Henze et al.: Jour. Amer. Chem. Soc., vol. 64 (March 1942), pp. 522 and 523.